(12) United States Patent
Ross et al.

(10) Patent No.: US 10,437,248 B1
(45) Date of Patent: Oct. 8, 2019

(54) SUN ADJUSTED STATION KEEPING METHODS AND SYSTEMS

(71) Applicant: Brunswick Corporation, Mettawa, IL (US)

(72) Inventors: Walter B. Ross, Fond du Lac, WI (US); Mark W. Henker, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 107 days.

(21) Appl. No.: 15/867,366

(22) Filed: Jan. 10, 2018

(51) Int. Cl.
*G05D 1/02* (2006.01)
*B63J 99/00* (2009.01)

(52) U.S. Cl.
CPC ............ *G05D 1/0206* (2013.01); *B63J 99/00* (2013.01); *B63J 2099/008* (2013.01)

(58) Field of Classification Search
CPC .... G05D 1/0206; B63J 99/00; B63J 2099/008
See application file for complete search history.

(56) References Cited

U.S. PATENT DOCUMENTS

| | | |
|---|---|---|
| 3,688,252 A | 8/1972 | Thompson |
| 3,715,571 A | 2/1973 | Braddon |
| 3,771,483 A | 11/1973 | Spencer |
| 4,253,149 A | 2/1981 | Cunningham et al. |
| 4,428,052 A | 1/1984 | Robinson et al. |
| 4,513,378 A | 4/1985 | Antkowiak |
| 4,939,661 A | 7/1990 | Barker et al. |
| 4,975,709 A | 12/1990 | Koike |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |

(Continued)

FOREIGN PATENT DOCUMENTS

| | | |
|---|---|---|
| JP | 2926533 B2 | 7/1999 |
| JP | 5042906 B2 | 7/2012 |

(Continued)

OTHER PUBLICATIONS

Ward et al., "Method and System for Close Proximity Collision Detection", U.S. Appl. No. 14/807,217, filed Jul. 23, 2015.

(Continued)

*Primary Examiner* — Aaron L Troost
(74) *Attorney, Agent, or Firm* — Andrus Intellectual Property Law, LLP

(57) ABSTRACT

A method of controlling position of a marine vessel in a body of water includes determining, at a control module, a relative heading instruction describing a position of the marine vessel relative to a position of the sun. A target global position for the marine vessel is received, and a position of the sun relative to the target global position is determined based on a current date and a current time. A sun adjusted heading is calculated for the marine vessel based on the position of the sun and the relative heading instruction. A current heading of the marine vessel is determined, and propulsion devices on the marine vessel are controlled to position the marine vessel at the target global position and align the current heading of the marine vessel at the sun adjusted heading.

20 Claims, 6 Drawing Sheets

(56) References Cited

U.S. PATENT DOCUMENTS

| | | | |
|---|---|---|---|
| 5,386,368 A | 1/1995 | Knight | |
| 5,390,125 A | 2/1995 | Sennott et al. | |
| 5,491,636 A | 2/1996 | Robertson et al. | |
| 5,736,962 A | 4/1998 | Tendler | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,308,651 B2 | 10/2001 | McKenney et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,678,589 B2 | 1/2004 | Robertson et al. | |
| 6,995,527 B2 | 2/2006 | DePasqua et al. | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,630,798 B2 | 12/2009 | Mossman et al. | |
| 7,727,036 B1 | 6/2010 | Poorman et al. | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,265,812 B2 | 9/2012 | Pease | |
| 8,326,472 B2 | 12/2012 | Igarashi et al. | |
| 8,417,399 B2 | 4/2013 | Arbuckle et al. | |
| 8,478,464 B2 * | 7/2013 | Arbuckle | B63H 21/22 114/144 B |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,248,898 B1 | 2/2016 | Kirchhoff et al. | |
| 9,359,057 B1 | 6/2016 | Andrasko et al. | |
| 9,377,780 B1 | 6/2016 | Arbuckle et al. | |
| 9,733,645 B1 | 8/2017 | Andrasko et al. | |
| 9,857,794 B1 | 1/2018 | Jarrell et al. | |
| 2004/0221787 A1 | 11/2004 | McKenney et al. | |
| 2005/0170713 A1 | 8/2005 | Okuyama | |
| 2006/0089794 A1 | 4/2006 | DePasqua | |
| 2007/0162207 A1 | 7/2007 | Shimo et al. | |
| 2007/0203623 A1 | 8/2007 | Saunders et al. | |
| 2009/0037040 A1 | 2/2009 | Salmon et al. | |
| 2012/0248259 A1 | 10/2012 | Page et al. | |
| 2014/0114509 A1 | 4/2014 | Venables et al. | |
| 2017/0253314 A1 | 9/2017 | Ward | |
| 2017/0255200 A1 | 9/2017 | Arbuckle | |
| 2017/0255201 A1 | 9/2017 | Arbuckle | |

FOREIGN PATENT DOCUMENTS

| | | | |
|---|---|---|---|
| JP | 5226355 B2 | 7/2013 | |
| WO | 9205505 A1 | 4/1992 | |

OTHER PUBLICATIONS

Poorman et al., "Multilayer Control System and Method for Controlling Movement of a Marine Vessel", U.S. Appl. No. 11/965,583, filed Dec. 27, 2007.

Beauregard, Brett, "Improving the Beginner's PID: Initialization," web article, posted Apr. 15, 2011, available at http://brettbeauregard.com/blog/2011/04/improvingthebeginner%e2%80%99spidinitialization/.

Man Diesel and Turbo, Basic Principles of Ship Propulsion, paper, Dec. 2011, Denmark.

Gonring, Steven J., "System and Method for Controlling Course of a Marine Vessel," U.S. Appl. No. 15/415,095, filed Jan. 25, 2017.

Arbuckle, Jason S., "Station Keeping Methods", U.S. Appl. No. 15/425,184, filed Feb. 6, 2017.

Arbuckle, Jason S., "Vessel Maneuvering Methods and Systems", U.S. Appl. No. 15/437,233, filed Feb. 20, 2017.

Arbuckle, Jason S., "Station Keeping Methods", U.S. Appl. No. 15/445,031, filed Feb. 28, 2017.

* cited by examiner

SUN ADJUSTED STATION KEEPING METHODS AND SYSTEMS

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various station keeping features and related system and method improvements include: U.S. Pat. Nos. 7,267,068; 8,050,630; 8,417,399; 8,694,248; 8,807,059; 8,924,054; 9,132,903; 9,377,780; 9,733,645; and unpublished U.S. patent application Ser. No. 14/807,217, filed Jul. 23, 2015; Ser. No. 15/425,184, filed Feb. 6, 2017; and Ser. No. 15/445,031, filed Feb. 28, 2017. Each of these patents and applications is hereby incorporated by reference herein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling position of a marine vessel in a body of water includes determining, at a control module, a relative heading instruction describing a position of the marine vessel relative to a position of the sun. A target global position for the marine vessel is received, and a position of the sun relative to the target global position is determined based on a current date and a current time. A sun adjusted heading is calculated for the marine vessel based on the position of the sun and the relative heading instruction. A current heading of the marine vessel is determined, and propulsion devices on the marine vessel are controlled to position the marine vessel at the target global position and align the current heading of the marine vessel at the sun adjusted heading.

One embodiment of a system for controlling position of a marine vessel in a body of water includes a marine propulsion device controllable to propel a marine vessel, a position determination device configured to determine a current global position of a marine vessel, and a heading detector configured to determine a current heading of the marine vessel. The system further includes a control module configured to receive user input defining a relative heading instruction providing a position of the marine vessel relative to a position of the sun and to determine a sun adjusted heading accordingly. Namely, the control module receives a target global position for the marine vessel and determines a position of the sun relative to the target global position based on a current date and a current time. A sun adjusted heading is then calculated based on the position of the sun and the relative heading instruction. The current global position is received from the position determination device and the current heading of the marine vessel is received from the heading detector. The propulsion device is then controlled such that the current position of the marine vessel is at the target global position and the current heading of the marine vessel is at the sun adjusted heading.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
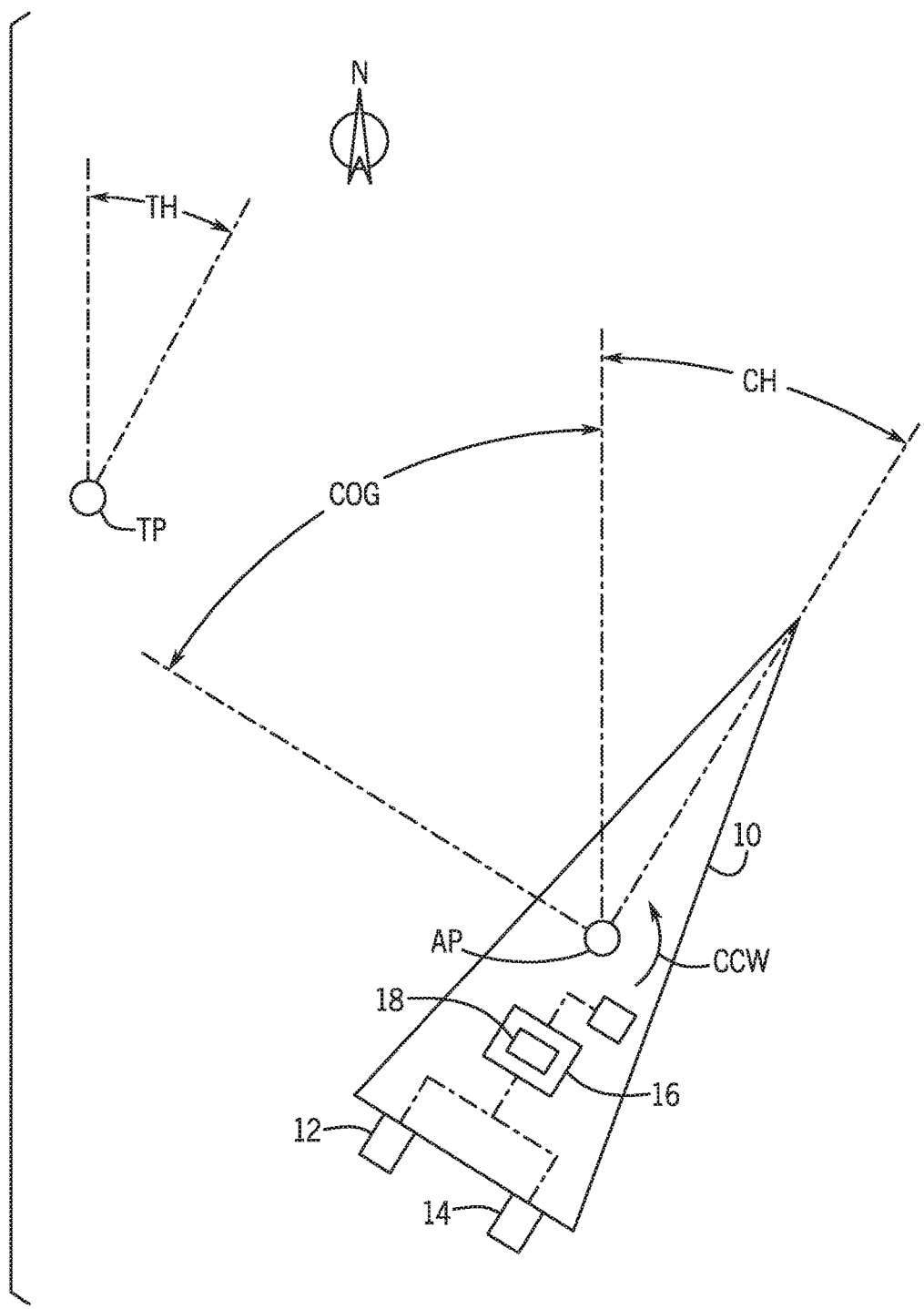
FIG. 1 is a schematic for purposes of illustrating a method for maintaining a marine vessel at a target global position and a target heading.

Referring to FIG. 1, in a station keeping mode, a marine vessel 10 can be maintained in a single global position (defined by latitude and longitude) and at a predetermined heading by way of an algorithm that controls the vessel's propulsion devices 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. A control module 16 that controls thrust and angular orientation of the propulsion devices 12, 14 acts as a joystick and calculates left/right, fore/aft, and yaw commands required to drive the vessel's position error and heading error to zero. The control module 16 can control one or more propulsion devices 12, 14 to do so, which may be located at the rear of the vessel 10 such as with outboards or stern drives, under the vessel 10 such as with pod drives, or at the front, back, or sides of the vessel 10 such as with thrusters.

An example of the inputs to the control module's calculations is shown in FIG. 1. In this example, the actual global position (AP) of a preselected point on the vessel 10, as determined by a GPS receiver, is not equal to a setpoint target global position (TP), and thus the control module 16 will calculate a course over ground (COG) that the vessel 10 must travel to reach the target global position TP. Additionally, a setpoint target heading (TH) is 27 degrees from north, while the current heading (CH) read from a compass or an inertial measurement unit (IMU) is 35.8 degrees. The control module 16 will therefore determine that a counterclockwise yaw movement (arrow CCW) of 8.8 degrees is required to return the vessel 10 to the target heading TH.

The control module 16 determines when and how much corrective action to take according to a three-dimensional (left/right, fore/aft, and yaw) proportional, integral, and derivative (PID) control algorithm performed by a feedback controller 18 of the control module 16. The integral term allows the control system to reject constant and slowly varying disturbances (e.g., current) while maintaining near zero position error. The proportional and derivative terms handle the quickly varying disturbances. The integral term is also considered to have memory and can take time to increase or decrease, especially if the disturbance forces grow. The PID feedback controller 18 computes a desired force in the forward/back and left/right directions with reference to the marine vessel 10, along with a desired yaw moment relative to the marine vessel 10, in order to null the error elements. The computed force and moment elements are then transmitted to the vessel propulsion system, which delivers the requested forces and moments by positioning the independently steerable propulsion devices 12, 14, controlling the power provided to the propellers of each device, and controlling the thrust vector directions of both devices. Such automatic correction of the position and heading of the marine vessel 10 can be achieved according to the principles described in U.S. Pat. No. 7,305,928, which was incorporated by reference herein above.

Figure 2:
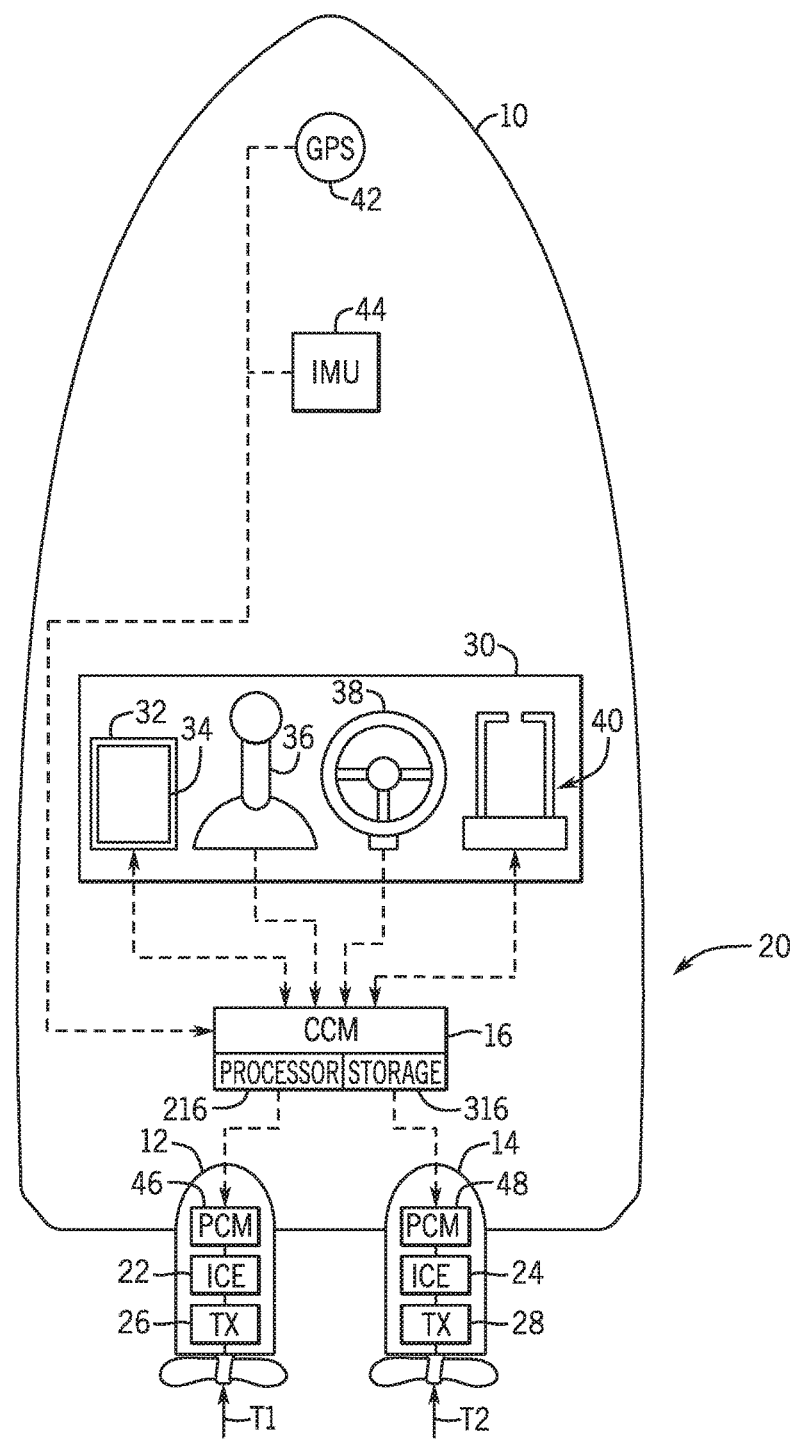
FIG. 2 is a schematic illustration of a marine vessel with a marine propulsion system.

A more detailed schematic of the marine vessel 10 is provided in FIG. 2. The marine vessel 10 includes a marine propulsion system 20 including a marine propulsion device. Here, two marine propulsion devices 12, 14 are shown, but only one propulsion device or more than two could be provided. A control module 16 (here, called a command control module "CCM") controls the magnitudes of thrusts T1, T2 of the propulsion devices 12, 14, such as by controlling speed of their internal combustion engines 22, 24. The control module 16 also controls shift positions of the propulsion devices 12, 14 between forward, neutral, and reverse by way of transmissions 26, 28. The steering angles of the propulsion devices 12, 14, which affect the angles of their thrusts T1, T2 with respect to an imaginary centerline of the marine vessel 10 running from bow to stern, are also controlled by the control module 16.

A command console 30 of the system 20 includes an electronic input device 32 having a display screen 34. For example, the electronic input device 32 can be a chart plotter, into which the operator of the vessel 10 can manually input anchor points, waypoints, or desired tracks; record actual routes as tracks; or download saved tracks, waypoints, or anchor points. Alternatively, the electronic input device 32 can be a series of gauges, buttons, levers, and/or a keypad that allows the operator of the vessel 10 to command the control module 16 to carry out various station keeping algorithms, as will be described herein below. A joystick 36 and a steering wheel 38 are also provided at the command console 30, and can provide steering commands to the propulsion devices 12, 14 via the control module 16, as is known. A pair of throttle/shift levers 40 is also provided, and the levers 40 are moveable between forward, neutral, and reverse positions, which signal the control module 16 to command corresponding shift positions of the transmissions 26, 28 and various speeds of the engines 22, 24, as is also known.

The system 20 also includes a position determination device 42, such as a GPS receiver, that provides to the control module 16 a current, actual geographic location of the vessel 10 in latitude and longitude. The position determination device 42 can also determine the speed of the vessel 10 over water by determining how far the vessel 10 travels, as determined from GPS position, over a given period of time. A heading detector 44, such as an inertial measurement unit (IMU), may also be provided in signal communication with the control module 16. The heading detector 44 detects a current, actual heading of the vessel 10. In other examples, the heading detector 44 is a compass and/or a gyroscope. In still other examples, the position determination device 42 and heading detector 44 are part of a single device, such as an attitude and heading reference system (AHRS) or a GPS-enabled IMU.

The control module 16 is programmable and includes a processing system and a storage system. The control module 16 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 16, the vessel 10 can include more than one control module. Portions of the method disclosed herein below can be carried out by a single control module or by several separate control modules. For example, as shown in FIG. 2, the system 20 can have a control module 16 located at or near the command console 30 of the vessel 10 and can also have control module(s), such as propulsion control modules "PCMs" 46, 48, located in or near the propulsion devices 12, 14. If more than one control module is provided, each can control operation of a specific device or sub-system on the vessel 10. For example, the PCMs 46, 48 can interpret and carry out commands from the CCM 16 in order to produce the thrusts T1, T2, rotate the propulsion devices 12, 14 to different steering angles, change the speed of the engines 22, 24, and change shift positions via the transmissions 26, 28. In alternative embodiments, the CCM 16 directly controls these functions of the propulsion devices 12, 14.

In some examples, the control module 16 may comprise a computing system that includes a processing system 216, storage system 316, software, and input/output (I/O) interface for communicating with peripheral devices. The systems may be implemented in hardware and/or software that carries out a programmed set of instructions. For example, the processing system loads and executes software from the storage system, such as software programmed with one or more sun tracking and sun adjusted station keeping algorithms, which direct the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system 316 can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The provided description of the control module 16 is conceptual and should be interpreted generally, as those skilled in the art will recognize many ways to implement such a control module. These include implementation using a digital microprocessor that receives input signals and performs a calculation based on the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

The control module 16 communicates with one or more of the components on the vessel 10 via the I/O interface and a communication link, which can be a wired or wireless link. In one example, the communication link is a controller area network (CAN) bus, but other types of links could be used. The I/O interface allows the control module 16 to interact with both input devices, such as the position determination device 42, the heading detector 44, the electronic input device 32, the joystick 36, the steering wheel 38, and the throttle/shift levers 40, as well as with output devices such as the display screen 34 of the electronic input device 32 and the propulsion devices 12, 14. Other types of input devices can be provided in signal communication with the control module 16, such as keyboards, remote controls, voice command receivers, touch screens, keypads, buttons, etc., any of which may be part of the electronic input device 32. In the example in which the electronic input device 32 is a chart plotter, it may include a touch screen, display-only screen, and/or a keypad or buttons that allows the operator to select a station keeping anchor point by scrolling through a menu or selecting it from the touch screen. The actual position of the vessel 10 with respect to the anchor point may be displayed on a map on the display screen 34 of the chart plotter.

The present inventors have recognized that operators using currently available station keeping features on marine vessels often have to adjust the heading setting to maintain a certain relative position of the marine vessel relative to the sun as the sun moves throughout the day. This is inconvenient for users and often requires a user to return to the helm to adjust the heading of the marine vessel. The current inventors have recognized that it is desirable for a control system of a marine vessel to be able to automatically maintain a position of the marine vessel with respect to a position of the sun, thereby to keep the sun at the same direction and illuminating (or not illuminating) the same portions of the marine vessel throughout the day. For example, an operator may want to maintain a sun deck on the front of the marine vessel in the sun all day, such as to maximize sun bathing. Alternatively, an operator may wish to maintain a particular portion of the marine vessel in the shade, such as to avoid being in the sun while lounging at a particular area of the marine vessel.

In view of the foregoing recognition of problems and needs in the relevant field, the inventors developed the disclosed system which maintains a position of the marine vessel relative to a position of the sun according to a relative heading instruction. A sun adjusted heading is calculated based on the relative heading instructions and a current position of the sun, which is determined with respect to a target global position and a current date and time. The sun adjusted heading calculation is then updated periodically as the sun moves, such as at predefined times of day, at predefined intervals, and/or when the position of the sun has changed by a threshold amount.

Figure 3:
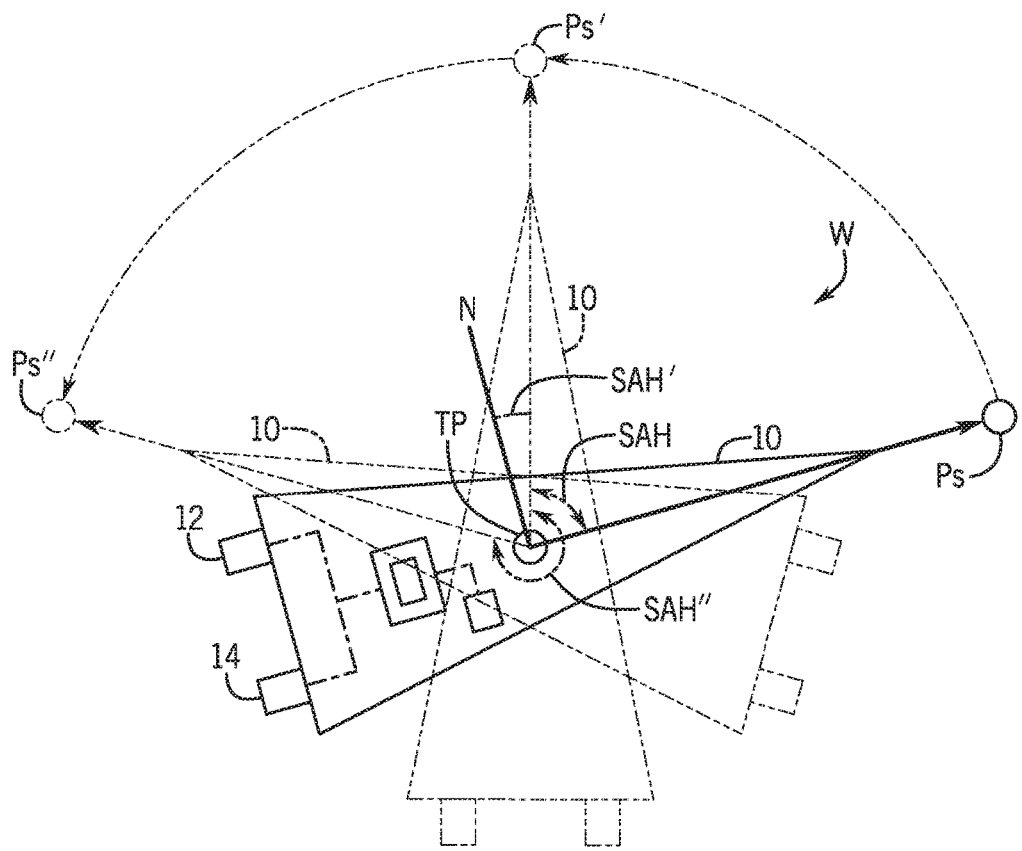
FIG. 3 depicts an exemplary scenario where the heading the marine vessel is adjusted based on the position of the sun as the sun moves throughout the day.

FIG. 3 depicts an exemplary embodiment where the heading of the marine vessel 10 is adjusted based on the position of the sun $P_s$ relative to the target global position TP as the sun moves throughout the day (e.g., $P_s$, $P_s'$, $P_s''$). In the depicted embodiment, the relative position of the sun $P_s$ is a location of the sun with respect to the horizontal water surface plane W on which the marine vessel is suspended. In other examples, the sun adjusted heading may be calculated based upon the position of the sun $P_s$ being a location in three-dimensional space describing a location of the sun in the sky relative to the target global position TP. The exemplary relative heading instruction RH (see also FIG. 5) instructs the current heading CH of the marine vessel to be toward the position of the sun such that the bow of the boat is pointed at the position of the sun $P_s$ with respect to the water surface plane W. This relative heading instruction RH is merely exemplary, and any other relative angle between the current heading CH and the position of the sun $P_s$ could be maintained.

As the position of the sun moves westward throughout the day, from a first exemplary position of the sun $P_s$ to a second exemplary position of the sun $P_s'$, and eventually to the third exemplary position of the sun $P_s''$, the sun adjusted heading SAH is recalculated and the marine vessel is moved accordingly to SAH' and SAH". The sun adjusted heading SAH may be described in any number of ways, such as a direction defined in the cardinal direction system (N-S-E-W). Such a heading instruction is then translated by the control module 16 into linear thrust vectors in order to maintain the current heading CH measured by the heading detector at the sun adjusted heading SAH. In the depicted example, the current heading CH and the sun adjusted heading SAH are defined as angles from north in the clockwise direction, which is merely one example of a possible standard definition.

Figure 4:
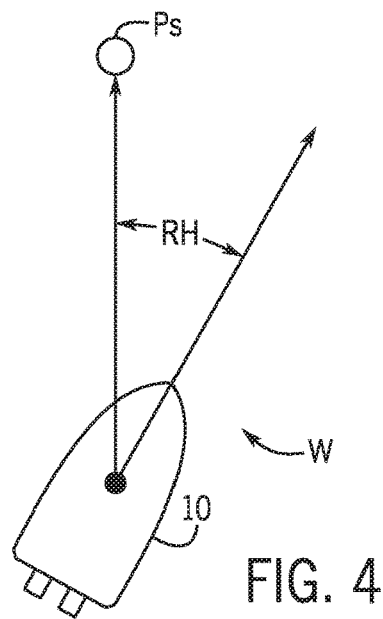
FIG. 4 illustrates one example of a relative heading instruction.

The sun adjusted heading SAH is calculated based on a relative heading instruction RH, which describes a position of the marine vessel that should be maintained relative to a position of the sun $P_s$. FIG. 4 depicts one example, where the relative heading instruction RH is an angle with respect to the position of the sun $P_s$ on the water surface plane W. The sun adjusted heading SAH is updated at regular intervals so that the sun exposure on the marine vessel remains as constant as possible throughout the day.

The relative heading instruction may be determined based on user input instructing what relative heading of the marine vessel should be maintained with respect to the position of the sun $P_s$. In various examples, the user input may be provided at the command console 30, such as via the electronic input device 32 or joystick 36. Alternatively or additionally, user input may be provided by a wirelessly-connected computing device, such as an operator's smart phone or tablet running an application to provide sun adjusted heading instructions to the control module 16. Such an application may, for example, interface with the control module 16 via the electronic input device 32 or other user input device at the command console 30.

For example, the user may select a particular portion of the marine vessel on which sun exposure should be minimized or maximized. For instance, a user may select a sun deck on the front of the marine vessel and may select for maximum sun exposure at that location. The control module 16 then determines the relative heading instruction so that maximum sun exposure at that user-selected location is provided. For example, the electronic input device 32 may be programmed to present particular sun adjustment options, such as various selectable portions of the marine vessel 10 and an option to minimize or maximize sun at that location. Each user input selection is associated with a relative heading instruction by the control module 16. For example, such relative heading instructions may be stored in a table or in another storage format in the storage system 316 of the control module 16.

Figure 5:
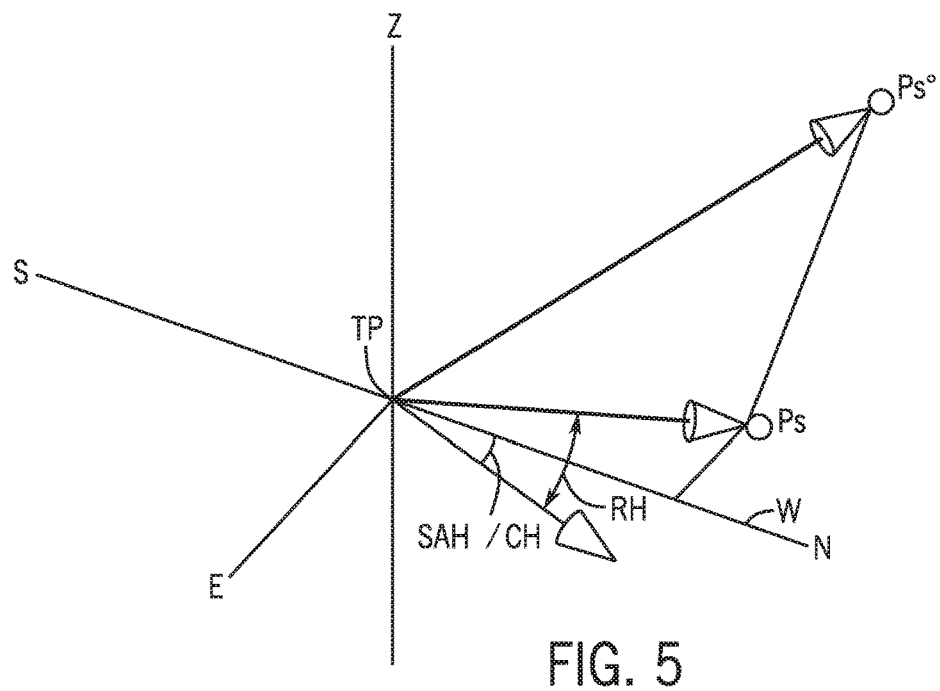
FIG. 5 illustrates a coordinate graph one example calculation of a sun adjusted heading.

In other embodiments, the relative heading instruction RH may be determined based on user input to maintenance of a current sun exposure—i.e., to select a current position of the marine vessel relative to the position of the sun $P_s$. In such an embodiment, the relative heading instruction RH is determined based on an angle between the current heading CH of the marine vessel measured by the heading detector 44 and the current position of the sun $P_s$ with respect to the water surface plane W. FIG. 5 is a coordinate graph illustrating such a calculation. The water surface plane W is illustrated as the cardinal coordinate system N-E-S-W with the z direction running normal thereto. The current heading CH measured by the heading detector 44 is selected by the user for the sun adjusted position, and thus is initially set as the sun adjusted heading SAH (which in the depicted example is defined with respect to cardinal north).

The position of the sun $P_s$ is then determined based on the target global position TP which may be a global position selected by the user or may be the current global position of the marine vessel determined by the position determination device 42 (such as the GPS system). For example, the position of the sun $P_s$ may be determined by the control module 16 by accessing a database of sun position values indexed according to longitude, latitude, date, and time. For example, the database of sun position values may be accessed utilizing the longitude and latitude of the target global position TP and the current date and time provided by the GPS 42. GPS signals provide precise time and date data, and thus the system 20 may utilize the location-based time information provided by the GPS satellite. Alternatively, the current time and date may be gleaned from an internal clock accessible to and/or comprising part of the control module 16.

Such a database may be stored in the storage system 316 comprising part of, or otherwise accessible to, the control module 16. For example, the database may contain values describing the location of the sun in three-dimensional space (e.g., $P_s°$) or a location in two-dimensional space with respect to the water surface plane W (e.g., $P_s$). Where the database contains 3D location values, the control module 16 may then convert the three-dimensional position of the sun $P_s°$ into a two-dimensional position of the sun $P_s$ with respect to the water surface plane W, and may calculate the relative heading instruction RH accordingly. In the example where the current heading CH is selected to be the maintained relative sun position, the relative heading instruction RH is determined as the difference between the current heading CH and the current position of the sun $P_s$ with respect to the water surface plane W at the time of receiving the user input.

Similarly, user input of a relative heading adjustment may be provided (e.g., via a command console device or an application on the user's hand-held computing device) whereby the user instructs adjustment of the relative heading of the marine vessel with respect to the position of the sun $P_s$. For example, presentation and receipt of sun adjustment selection may be provided via an application on the user's hand-held computing device, and such information may be transmitted to the electronic input device 32, which then communicates the user input to the control module 16.

When the system is in a sun adjusted station keeping mode, certain user interface devices may be configured to facilitate user input to select a sun adjusted heading SAH, select maintenance of a current relative sun position, or provide a relative heading adjustment. As is known, the operator can use an electronic input device 32 such as a chart plotter, keypad or trackpad, a joystick 36, a steering wheel 38, or the like, which can be programmed to allow the operator to change a different axis of the vessel's orientation while maintaining all other axes (e.g., to change heading while maintaining a current global position).

One exemplary user input means for providing a relative heading adjustment is to accept input to a keypad, which has right and left "turn" buttons, as being a command to rotate right or left. Another option is to accept input from a joystick 36. For instance, a push of the left turn button or a rotational movement of the joystick 36 in the counterclockwise direction may be associated with a relative heading adjustment of n degrees in the counter-clockwise direction. An interactive display device with a touchscreen (e.g. electronic input device 32 and display screen 34) could also be configured to facilitate such input. The steering wheel 38 could also be used to adjust the relative heading while in the sun adjusted station keeping mode, where the degree of turn of the steering wheel 38 translates to a request for a proportional change in the relative heading instruction RH. When the operator ceases input to the given user input device, the station keeping algorithm will actuate and maintain the newly commanded orientation with respect to the position of the sun $P_s$. Some examples of user input devices that can be used to change different axes of orientation are provided herein, it being understood that various alternatives are within the scope of the present disclosure.

The sun adjusted station keeping mode may be activatable while the system 20 is in a station keeping mode. Alternatively or additionally, the sun adjusted station keeping mode may be engaged and disengaged via the same activation means utilized for engaging and disengaging the standard station keeping mode. Methods of engaging and disengaging station keeping are described in the patents incorporated herein by reference, and methods for moving vessels according to commands from a joystick 36 or throttle/shift levers 40 and steering wheel 38 are well known, and therefore these methods will not be described further herein.

Figure 6:
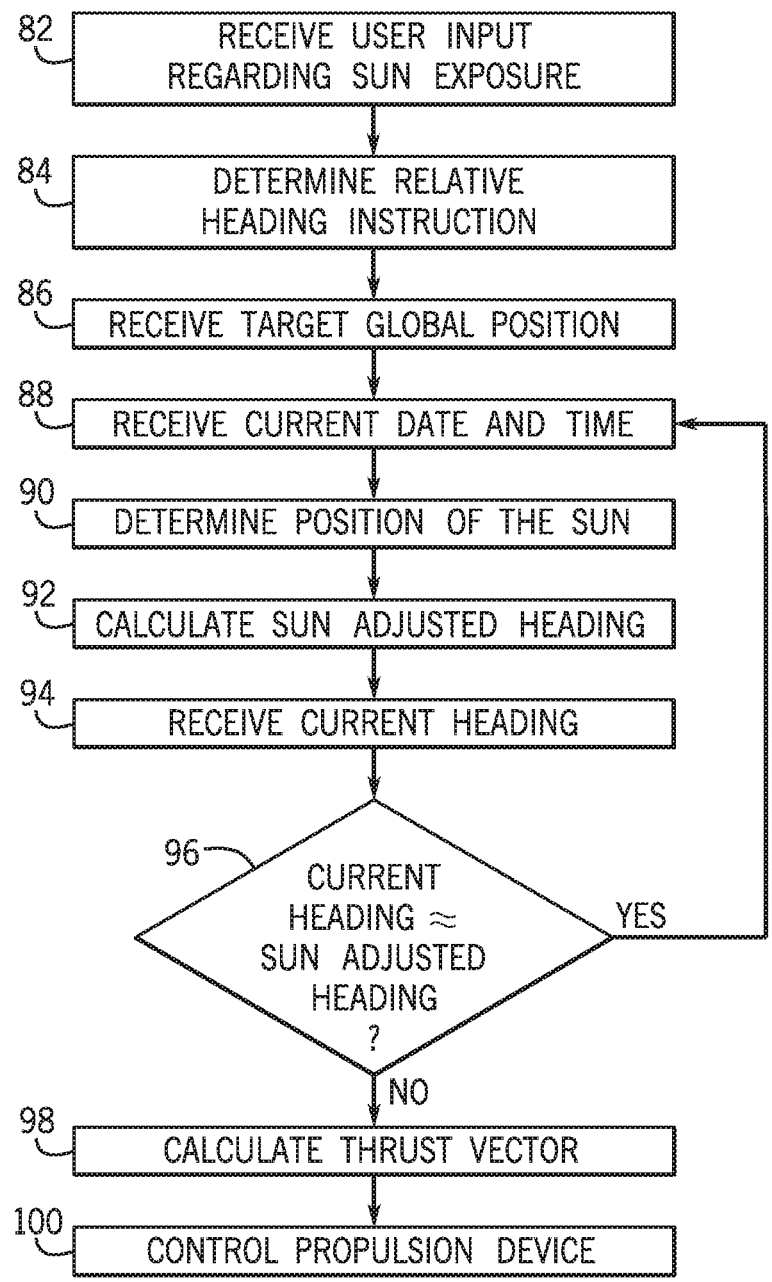
FIGS. 6-7 are flow charts depicting exemplary methods for calculating and maintaining a sun adjusted heading.
Figure 7:
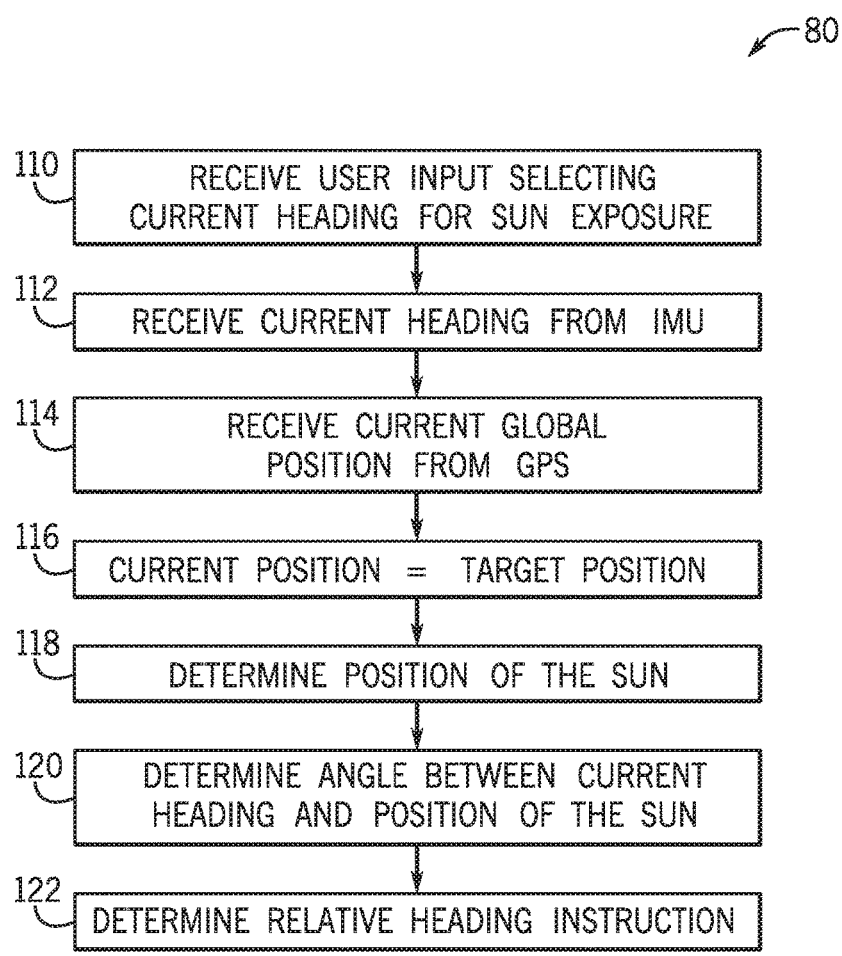

FIGS. 6 and 7 depict exemplary method 80 of controlling positions of the marine vessel 10 to provide heading adjustment based on sun position. A user input regarding desired sun exposure is received at step 82, and the relative heading instruction RH is determined accordingly at step 84. The user input may be, for example, a selection by an operator via a user interface, such as on the display screen 34 of the electronic input device 32, to maximize or minimize sun exposure on a user-selected portion of the marine vessel 10, as is described above. In other examples, the user input may select a current heading CH as the relative position for sun exposure, and the relative heading instruction RH is calculated accordingly.

The target global position TP is received at step 86, such as from the position determination device 42 and a current date and time are received at step 88, which may also be determined based on the GPS signal received at the GPS position determination device 42. The position of the sun is then determined at step 90 based on the target global position TP and the current date and time. In other examples, the target global position TP and/or current date and time may be obtained by other means, such as inputted by a user via the command console 30. For example, the user may input a target latitude and longitude and/or a current date and time, such as via an appropriately configured user interface presented on the display screen 34 of the electronic input device 32.

The sun adjusted heading SAH is then calculated at step 92 based on the relative heading instruction RH and the position of the sun $P_s$. Once the sun adjusted heading is calculated, then the control module 16 operates to orient and/or maintain the heading of the marine vessel 10 at the sun adjusted heading SAH. Accordingly, a current heading CH is received at step 94, such as from the IMU or other heading detector 44. The current heading CH is compared to the sun adjusted heading SAH at step 96. If the current heading equals the sun adjusted heading then no action or change in action is needed from the propulsion devices. However, if the current heading is not within a predetermined range of the sun adjusted heading, for example, then a thrust vector is calculated at step 98 in order to bring the current heading CH in line with the sun adjusted heading SAH. The propulsion devices are then controlled to effectuate the thrust vector at step 100, such as by adjusting the steering angle and/or engine speed of the propulsion devices 12 and 14 by methods described above and in the incorporated references.

FIG. 7 depicts one example of a method 80 of controlling position of a marine vessel 10 whereby the relative heading instruction RH is calculated based on a current heading. User input is received at step 110 selecting a current relative position for sun exposure. The current heading CH is received from the IMU at step 112 and a current global position is received from the GPS at step 114. The target global position TP is set to the current global position at step 116, thus to maintain the current GPS location of the marine vessel 10. In other embodiments, the target global position TP may be GPS coordinates inputted or selected by an operator via the electronic input device 32 or other user input device, for example. The position of the sun is then determined at step 118, such as in accordance with the illustration at FIG. 6 and described above. An angle between the current heading CH and the position of the sun $P_s$, such as on the water surface plane W, is determined at step 120. The relative heading instruction RH is then determined accordingly at step 122, such as by setting the relative heading instruction RH equal to the angle between the current heading CH and the current position of the sun $P_s$.

In other embodiments, the relative heading instruction RH may be determined based on a three-dimensional position of the sun $P_s°$, such as to adjust the heading based on the position of the sun in the z direction (i.e., based upon whether the sun is high or low with respect to the horizon). Thus, preset adjustments may be incorporated in the relative heading instruction RH to maximize or minimize sun exposure for a particular marine vessel 10 depending on the elevation portion of the position of the sun $P_s°$, or height of the sun in the z direction.

The sun adjusted heading SAH is then updated as the sun moves. In various embodiments, the control module 16 may be configured to re-determine the position of the sun $P_s$ and calculate an updated sun adjusted heading SAH at predefined times of day. For example, the position of the sun $P_s$ with respect to the water surface plane W will change at a faster rate when the sun is closer to the horizon, thus around sunrise and sunset. Thus, the control module 16 may be configured to update the sun adjusted heading SAH more frequently at those times, and less frequently in the middle of the day. Similarly, the control module 16 may be configured to update the sun adjusted heading SAH at predefined time intervals, which may be a set time interval (e.g., every five minutes) or may be a variable time interval depending on the time of day (such as at shorter time intervals during early and late sunlight hours and at progressively longer intervals toward the midday hours). In other embodiments, the control module 16 may be configured to update the sun adjusted heading SAH upon a threshold change in position of the sun. This has the same effect as the variable time intervals and variable times of day, where the sun adjusted heading is updated more frequently closer to sunrise and sunset than during midday. For example, the control module 16 may be configured to regularly determine the position of the sun $P_s$ based on the target global position TP and the current date and time. The sun adjusted heading SAH may be calculated and/or effectuated by the propulsion devices 12, 14 when the current position of the sun $P_s$ changes by a threshold amount from the previous position of the sun $P_s$ that was used to calculate the current sun adjusted heading SAH. For instance, the sun adjusted heading SAH of the marine vessel may be updated when the position of the sun $P_s$ with respect to the water surface plane W changes by a threshold amount. To provide just one example, the threshold change in position of the sun $P_s$ may be three degrees or five degrees. In other examples, greater or lesser threshold changes may be utilized.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling position of a marine vessel in a body of water, the vessel being propelled by a marine propulsion device, the method comprising:
   with a control module, determining a relative heading instruction describing a position of the marine vessel relative to a position of the sun;
   receiving a target global position for the marine vessel;
   determining the position of the sun relative to the target global position based on a current date and a current time;
   calculating a sun adjusted heading for the marine vessel based on the position of the sun and the relative heading instruction;
   determining an current heading of the marine vessel; and
   with the control module, controlling the propulsion device to position the marine vessel at the target global position and align the current heading of the marine vessel at the sun adjusted heading.

2. The method of claim 1, further comprising:
   receiving user input to maximize sun exposure on a user-selected portion of the marine vessel or to minimize sun exposure on the user-selected portion of the marine vessel; and
   wherein the relative heading instruction is determined based on the user input.

3. The method of claim 1, wherein the sun adjusted heading is periodically updated as the position of the sun changes so as to maintain the relative heading instruction.

4. The method of claim 1, further comprising:
   determining a current global position and the current heading of the marine vessel;
   storing the current global position as the target global position; and
   calculating the relative heading instruction based on an angle between the current heading and position of the sun.

5. The method of claim 1, wherein the position of the sun relative to the target global position is a direction of the sun on a water surface plane relative to the target global position.

6. The method of claim 5, wherein the relative heading instruction is an angle on the water surface plane relative to the position of the sun.

7. The method of claim 1, wherein the position of the sun describes a location of the sun in three-dimensional space relative to the target global position.

8. The method of claim 7, wherein the sun adjusted heading is determined based on the position of the sun in three-dimensional space in order to either minimize or maximize the amount of sun on a user-selected portion of the marine vessel.

9. The method of claim 7, wherein determining the sun adjusted heading includes converting the position of the sun in three-dimensional space to a location of the sun on a water surface plane relative to the target global position.

10. The method of claim 1, further comprising updating the sun adjusted heading to account for a change in the position of the sun, controlling the propulsion device to maintain the current heading of the marine vessel at the updated sun adjusted heading.

11. The method of claim 10, wherein the sun adjusted heading is updated at predefined times of day.

12. The method of claim 10, wherein the sun adjusted heading is updated at predefined time intervals.

13. The method of claim 10, wherein the sun adjusted heading is updated upon a threshold change in the position of the sun.

14. The method of claim 1, further comprising:
   receiving user input defining a relative heading adjustment;
   changing the relative heading instruction based on the relative heading adjustment;
   calculating an updated sun adjusted heading based on the changed relative heading instruction; and
   controlling the propulsion device to align the current heading of the marine vessel at the sun adjusted heading.

15. A system for controlling position of a marine vessel in a body of water, the system comprising:
   a marine propulsion device controllable to propel a marine vessel;
   a position determination device configured to determine a current global position of the marine vessel;
   a heading detector configured to determine a current heading of the marine vessel;
   a control module configured to:
      determining a relative heading instruction based on a user input, wherein the relative heading instruction describes a position of the marine vessel relative to a position of the sun;
      receive a target global position for the marine vessel;
      determine the position of the sun relative to the target global position based on a current date and a current time;
      calculate a sun adjusted heading for the marine vessel based on the position of the sun and the relative heading instruction;
      receive the current global position from the position determination device;
      receive the current heading of the marine vessel from the heading detector; and control the propulsion device to align that the current position of the marine vessel at the target global position and the current heading of the marine vessel at the sun adjusted heading.

16. The system of claim 15, wherein the control module is further configured to periodically update the sun adjusted heading in accordance with the relative heading instruction as the position of the sun changes.

17. The system of claim 15, further comprising a database of position of the sun values indexed according to longitude, latitude, date, and time, wherein the database is stored in a storage system accessible by the control module.

18. The system of claim 17, wherein the position of the sun values are locations of the sun on a water surface plane relative to a longitude and a latitude of the target global position, and the relative heading instruction is an angle on the water surface plane relative to the position of the sun.

19. The system of claim 15, wherein the user input includes instruction to maximize sun exposure on a user-selected portion of the marine vessel or to minimize sun exposure on the user-selected portion of the marine vessel.

20. The system of claim 15, wherein the user input includes instruction to maintain a current position of the marine vessel relative to the position of the sun, and wherein, upon receiving the user input, the control module is further configured to:
- determine the current global position and the current heading of the marine vessel;
- store the current global position as the target global position; and
- calculate the relative heading instruction based on an angle between the current heading and the position of the sun.

* * * * *